(12) United States Patent
Hsu et al.

(10) Patent No.: US 8,285,199 B2
(45) Date of Patent: Oct. 9, 2012

(54) AUTO-DEPLOYING AN APPLICATION FROM A MOBILE DEVICE TO A HOST IN A PERVASIVE COMPUTING ENVIRONMENT

(75) Inventors: Tony S. T. Hsu, Taipei (TW); Charles H. Lu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 12/258,743

(22) Filed: Oct. 27, 2008

(65) Prior Publication Data

US 2009/0111453 A1 Apr. 30, 2009

(30) Foreign Application Priority Data

Oct. 31, 2007 (TW) .............................. 96141120 A

(51) Int. Cl.
*H04H 40/00* (2008.01)
*H04M 3/00* (2006.01)
(52) U.S. Cl. .......... 455/3.06; 455/420; 463/42; 717/178
(58) Field of Classification Search ............... 455/412.1, 455/3.06, 420; 717/178; 463/39–42
See application file for complete search history.

(56) References Cited

U.S. PATENT DOCUMENTS

| 6,292,181 | B1 | 9/2001 | Banerjee et al. |
| 7,438,643 | B2 * | 10/2008 | Brosnan et al. ................. 463/42 |
| 7,502,610 | B2 * | 3/2009 | Maher ............................ 455/419 |
| 7,593,744 | B2 * | 9/2009 | Majahan ........................ 455/519 |
| 7,725,141 | B2 * | 5/2010 | Su .............................. 455/575.1 |
| 8,113,951 | B2 * | 2/2012 | David et al. ...................... 463/30 |
| 8,152,633 | B2 * | 4/2012 | Leingang ........................ 463/29 |
| 2005/0055309 | A1 * | 3/2005 | Williams et al. ................ 705/40 |
| 2006/0146772 | A1 * | 7/2006 | Geva et al. ..................... 370/338 |
| 2006/0189382 | A1 | 8/2006 | Muir et al. |
| 2007/0123309 | A1 * | 5/2007 | Sano et al. ..................... 455/566 |
| 2007/0192462 | A1 * | 8/2007 | Bae et al. ....................... 709/223 |
| 2008/0180302 | A1 * | 7/2008 | Amron .......................... 341/176 |
| 2010/0100446 | A1 * | 4/2010 | Kim ............................ 705/14.64 |
| 2010/0279733 | A1 * | 11/2010 | Karsten et al. ............. 455/552.1 |

FOREIGN PATENT DOCUMENTS

CN 1659537 A 8/2005
WO 03047710 A2 6/2003

OTHER PUBLICATIONS

Singh, S., et al. "Anywhere, Any-device Gaming," [online] IE2004: Australian Workshop on Interactive Entertainment Feb. 13, 2004, [retrieved Oct. 27, 2008], retrieved from the Internet: <http://www.ieconference.org/ie2004/proceedings/023%20singh.pdf>.
"'DoCoMo phones swing Wiimote-style." [online] CNet UK Reuters, Ltd., Apr. 24, 2007, [retrieved Oct. 20, 2008], retrieved from the Internet: <http://news.cnet.co.uk/mobiles/0,39029678,49289918,00.htm>.
"Salling Clicker for Windows 3.5: Your Computer, Untethered," [online] Salling Software, [retrieved Oct. 20, 2008], retrieved from the Internet: <http://www.salling.com/Clicker/windows/>.

* cited by examiner

*Primary Examiner* — Lester Kincaid
*Assistant Examiner* — Steven Kelley
(74) *Attorney, Agent, or Firm* — Patents on Demand P.A.; Brian K. Buchheit; Scott M. Garrett

(57) ABSTRACT

Disclosed is a technique for auto-deploying an application from a mobile communication device to a host in a pervasive computing environment. The technique can detect and can select an available host around the mobile communication device. The technique can determine if the mobile communication device issues a request of auto-deploying a selected application into the available host. In response to the issued auto-deploying request, the selected application can be auto-deployed into the available host for execution.

18 Claims, 7 Drawing Sheets

AUTO-DEPLOYING AN APPLICATION FROM A MOBILE DEVICE TO A HOST IN A PERVASIVE COMPUTING ENVIRONMENT

CROSS-REFERENCE TO RELATED APPLICATIONS

This application claims the benefit of Taiwanese Patent Application No. 96141120 filed 31 Oct. 2007, entitled "Method For Auto-Deploying an Application From a Mobile Device to a Host in a Pervasive Computing Environment and the Mobile Device Implementing the Method", which is assigned to the assignee of the present application, and the teachings of which are hereby incorporated by reference in their entirety

BACKGROUND

The present invention relates to a field of mobile devices and mobile device software and, more particularly, to auto-deploying an application from a mobile device to a host in a pervasive computing environment.

As many mobile devices (e.g., smart mobile phone) are increasingly entering the market. These devices are continuously being developed for increased capabilities. These increasing capabilities include processing power, memory capability (or memory card slots to extend the storage capacity), network connectivity capabilities (e.g., WIFI, telephony, BLUETOOTH, and other Over the Air (OTA) capabilities), digital cameras, etc. As capabilities grow, so do applications designed to utilize these capabilities.

NTT DoCoMo, in May 2007, unveiled a new mobile phone equipped with a motion sensor, D904i series. People can swing the handset like a tennis racket or wield it like sword, similar to WII Remote (dubbed a WIIMOTE), to enjoy the game experience provided by the current popular NINTENDO WII console.

A paper published by Human Interface Technology Laboratory, Department of Electrical & Computer Engineering, Siddharth Singh, et al. titled "Anywhere, Any-device Gaming" discloses a multi-player networked Pong game that can be played in real-time on mobile devices and stationary PCs. The system for implementing the multi-player networked game includes a SONY-ERICSSON P800 phone, a central game server hosting multiple games, and personal computers. A player may connect to the game server using a game console, a mobile phone or a personal computer. The client-server model has been used so that all interaction is done through the game server. The server supports multiple connectivity methods such that the same game may be played simultaneously on multiple devices. The server can also be used to support seamless migration from one device to another when playing an online game. For example, a player can play an online game on her game console at home, connected to the Internet. Then in the day time while on the move or sitting on a bus or train, she/he can continue to play the game seamlessly. In other words, there is no interruption no matter what device she is using.

The WII is the fifth home video game console released by NINTENDO. The WII competes with other seventh-generation consoles in the market, primarily MICROSOFT's XBOX 360 and SONY's PLAYSTATION 3. The WII system includes a WII console and a WII Remote, which is a wireless controller for the WII console. The WII Remote is a game controller that uses a built-in motion detector, which is a combination of built-in accelerometers and infrared detection. The WII Remote can be used as a handheld pointing device and detect movement in three dimensions. The WII is a very popular game console in the market.

However, it is inconvenient to carry the WII console to other places due to the limitation of size. Currently, in WII environment, games are stored in the WII console and cannot be shared with friends easily. Moreover, a user has to use the WII Remote embedded with the motion detector to sense its motions and interact with items on screen. This causes inconvenience in use, especially for a multi-user situation which has to prepare a WII Remote for each user. In addition, the WII Remote only provides motion-detection and limited data input capabilities.

The techniques as mentioned above require that games must be stored in a WII console or a central game server which is not convenient for transport, and a user must have a WII console and a WII Remote in advance for games/applications similar to WII games. It is inconvenient for a user who wants to carry WII games to his/her friends' home for sharing.

BRIEF SUMMARY

There is a need to provide a portable application framework, especially for a pervasive environment in which a user can carry and play games/applications everywhere by leveraging a mobile phone. As such, a user can conveniently deploy the games/applications automatically from the mobile phone to any available local host around the mobile phone, and can utilize the mobile phone to communicate/interact with the local host for sharing the games with his/her friends without the need to carry a WII console and a WII Remote.

The disclosure provides a method and a means for auto-deploying an application from a mobile communication device to a host in a pervasive computing environment. The method or means can detect and can select an available host around the mobile communication device. The method or means can determine if the mobile communication device issues a request of auto-deploying a selected application into the available host. In response to the issued auto-deploying request, the selected application can be auto-deployed into the available host for execution.

DETAILED DESCRIPTION

Figure 1:
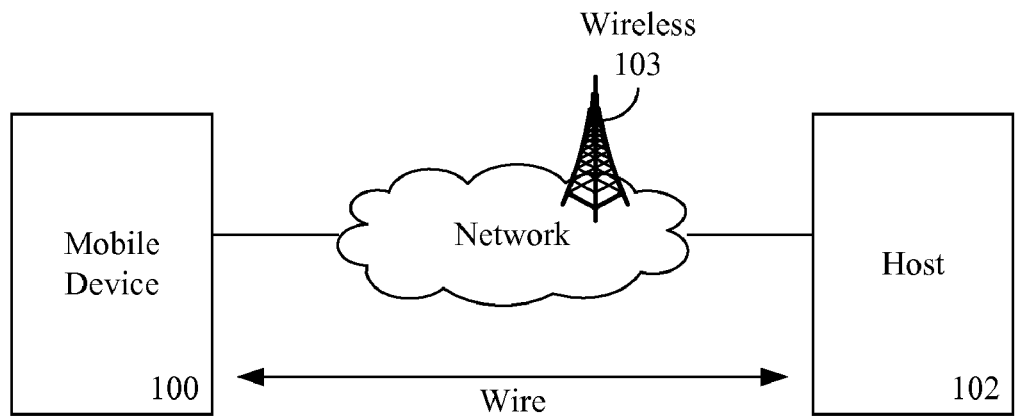
FIG. 1 and FIG. 2, respectively, depict a hardware and a software environment in accordance with an embodiment of the present invention.

The following will describe the embodiment of the present invention. The disclosed embodiment is for illustration purposes only, thus it will be understood by those skilled in the art that there are many modifications and changes made therein without departing from the spirit and scope of the invention. Throughout the appended drawings, similar features are identified by similar reference numerals.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module" or "system." Furthermore, the present invention may take the form of a computer program product on a computer usable storage medium having computer usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
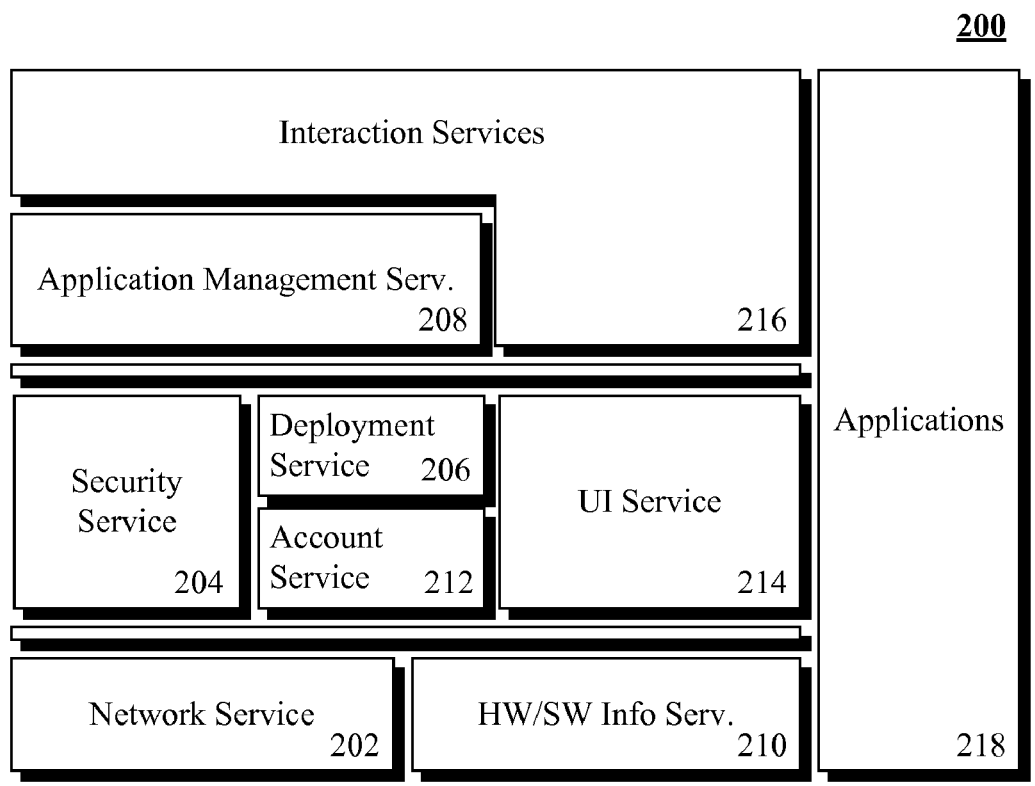

FIG. 1 and FIG. 2, respectively, depict a hardware and a software environment in accordance with an embodiment of the present invention. As illustrated in FIG. 1, a mobile communication device 100 (e.g., a mobile phone or a PDA, etc.) can interact with a host 102 using any wireless (e.g., GPRS, 3G, CDMA, CDMA 2000, UMTS, W-CDMA, TD-SCDMA, Wi-Fi, WiMAX, HSPA, BLUETOOTH, IrDA, etc.) or wired (e.g., USB, etc.) technologies. The mobile communication device 100 may include memory card slots for expansion in addition to a processing unit, a memory, and a built-in motion detector (not shown). The host 102 may be any kind of computer system (e.g., IBM PC) used to run programs. The computer system is at least configured to include a processing unit used to execute program instructions, a memory coupled to the processing unit, an operating system (such as WINDOWS XP or VISTA) populated in the memory, and a display. The computer system also supports some kinds of communication technologies as mentioned above. Currently, most users usually carry a mobile phone all the time rather than a WII Remote. In accordance with the embodiment of the invention, while an application is stored into a mobile phone, and an available host is found out around the mobile phone, the mobile phone can be used to deploy the games/applications automatically from the mobile phone to the host 102 for execution and interaction with the mobile phone.

FIG. 2 depicts a system environment framework 200 at a mobile communication device site in accordance with an embodiment of the present invention. The framework includes modules respectively as a network service 202, a security service 204, a deployment service 206, an application management service 208, a software/hardware information service 210, an account service 212, a user interface (UI) service 214, an interaction service 216 and applications 218.

A network service 202 provides a network capability to set up communication between a mobile communication device 100 and a host 102. As mentioned above, the mobile communication device 100 can be any type of wireless or wire connection. The wire connection types generally require a network connection capability, for example, similar to ACTIVESYNC provided by MICROSOFT or NOKIA PC Sync, to set up data synchronization and a connection between a mobile communication device 100 and a host 102.

A security service 204 provides a security mechanism between a mobile communication device and a host to avoid any data loss.

A deployment service 206 provides deployment capability, similar to an OSGi (Open Services Gateway initiative) model, to deploy an application for use.

An application management service 208 provides capability to manage applications, such as management of program lifecycle (e.g., functions supported by application management software (AMS) in MIDP 2.0 specification), data synchronization or digital rights management (DRM), etc.

A software/hardware information service 210 provides capability to check if the host has the capability to support software/hardware (e.g., the version of operation system or memory support, etc.) to deploy the applications.

An account service 212 provides management of account of a user which can connect to hosts, and messages related to the user's device.

UI service 214 provides an interface for managing the interaction between a mobile communication device and a host, the selection of applications to be deployed, or the selection of available hosts detected by a user's mobile communication device around itself, etc.

An interaction service 216 handles the interaction operation between a mobile communication device and a host.

Applications 218 are the programs that can be deployed to a host.

The host site 102 also includes a system environment framework corresponding to that shown at a mobile communication device site to interact with the mobile communication device.

Figure 3:
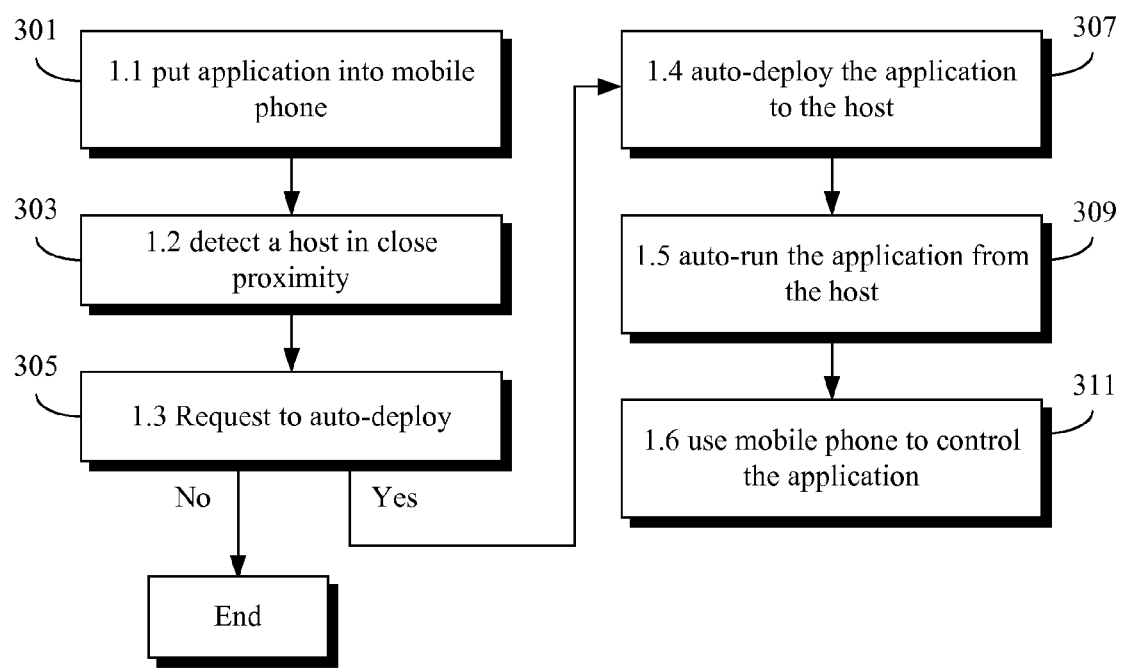
FIG. 3 is a flowchart of automatically deploying an application to a host by leveraging a mobile communication device in accordance with an embodiment of the invention.

FIG. 3 is a flowchart of automatically deploying an application to a host by leveraging a mobile communication device in accordance with an embodiment of the invention. Beginning at step 301, an application is downloaded into a mobile communication device. Typically, the application can be downloaded via a wide variety of ways. For instance, the application can be directly copied from a server or any computer system storing the application into the mobile communication device in a wire connection manner via USB. The application can also be downloaded from a server via a network in a wireless connection manner by using any conventional download technology. For example, with OTA (over-the-air) or WAP PUSH technologies, etc., download information (e.g., URL of the application, etc.) of the application can be provided to the mobile communication device for download of the application. The invention is not limited to downloading only one application. A set of games/applications can be downloaded to the mobile communication device for use as desired. Next, the mobile communication device detects whether or not there are any available hosts in close proximity to the mobile communication device, and selects an available host (step 303). The step 303 will be further described in more detail with reference to FIGS. 5 and 6.

Referring still to FIG. 3, a determination is made at step 305 as to whether the mobile communication device sends the selected available host a request of automatically deploying a desired game/application. If yes, go to step 307 to automatically deploy the desired game/application to the selected host, when the selected host accepts the request, otherwise go to the end. The operation of "automatically deploy" is also called "auto-deploy". The more detailed descriptions will be recited with reference to FIG. 7. The deploy step 307 typically may be performed by means of any methods, for example, the OSGi model as mentioned above to deploy the application. In general, there is merely a need to deploy the core functions of a desired application for launching the application, and access the rest of the application from the mobile communication device when necessary. Hence, there is generally no need to deploy the full size of the application into the host. At step 309, the mobile communication device may send a request to launch the desired application which is deployed in the host, and auto-run the application from the host. The auto-run mechanism is similar to the auto-play mechanism executed in WINDOWS environment when a user inserts a CD into CD-ROM.

Finally, the consistency of configuration/environment setup (e.g., the setup of buttons, speed, voice, CCD or microphone, etc.) between any input device and/or the motion detector embedded on the mobile communication device and the desired application deployed in the host is established through the synchronization communication between the mobile communication device and the host which is set up by the network service 202. Afterward, a user can use the mobile communication device interacted with the host to control the application (similar to control a WII game via WII Remote) at step 311. Consequently, according to the embodiment of the invention, a user can only bring a mobile communication device with a built-in motion detector and a desired application (e.g., similar to a WII game) to any place having an available host, and auto-deploy the desired application into the host and then launch it for playing. In addition, the mobile communication device can also be used as a remote controller to interact with the host for controlling the application deployed in the host. The user does not need to carry a WII console with a WII Remote to other place to run WII games. As such, the embodiment of the invention solves the inconvenience caused by a requirement of preparing a set of WII Remote controllers for users' usage as usual.

Figure 4:
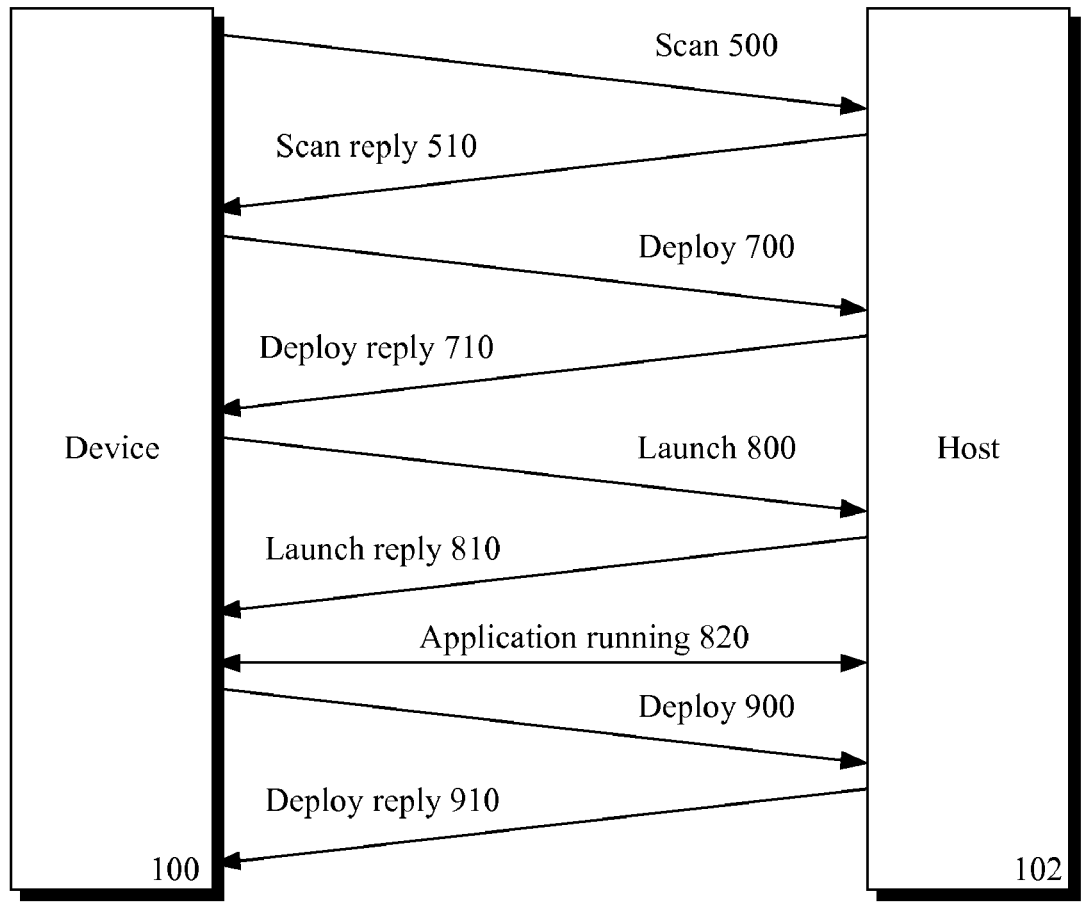
FIG. 4 is a basic flow diagram of the interaction between a mobile communication device 100 (e.g., mobile phone) and a host 102 in accordance with an embodiment of the invention.

FIG. 4 is a basic flow diagram of the interaction between a mobile communication device 100 (e.g., mobile phone) and a host 102 in accordance with an embodiment of the invention. Initially, a user uses the mobile communication device 100 to scan and search an available host around the device 100 (step 500). When an available host 102 is located, the host 102 will issue a response to the device 100 (step 510). In reply to the response indicating that an available host 102 is located, the mobile communication device 100 sends out a request of deployment of a desired program to a host (step 700). If there are more than one hosts being found, a user of the mobile communication device selects a preferred host through the UI service 214 in the mobile communication device. When the deployment of the desired application is finished, the host 102 will issue a response to the device 100 (step 710). Subsequently, the mobile communication device sends out a request to launch a desired application (e.g., a game) deployed in the preferred host at step 800. After finishing the launch operation, the host 102 will issue a response to the device 100 (step 810). Finally, the desired application is in a running state and running in the preferred host, and then the user can utilize the device 100 to communicate and interact with the preferred host to control the application (step 820). The user can further deploy other applications to the host as desired (step 900).

Figure 5:
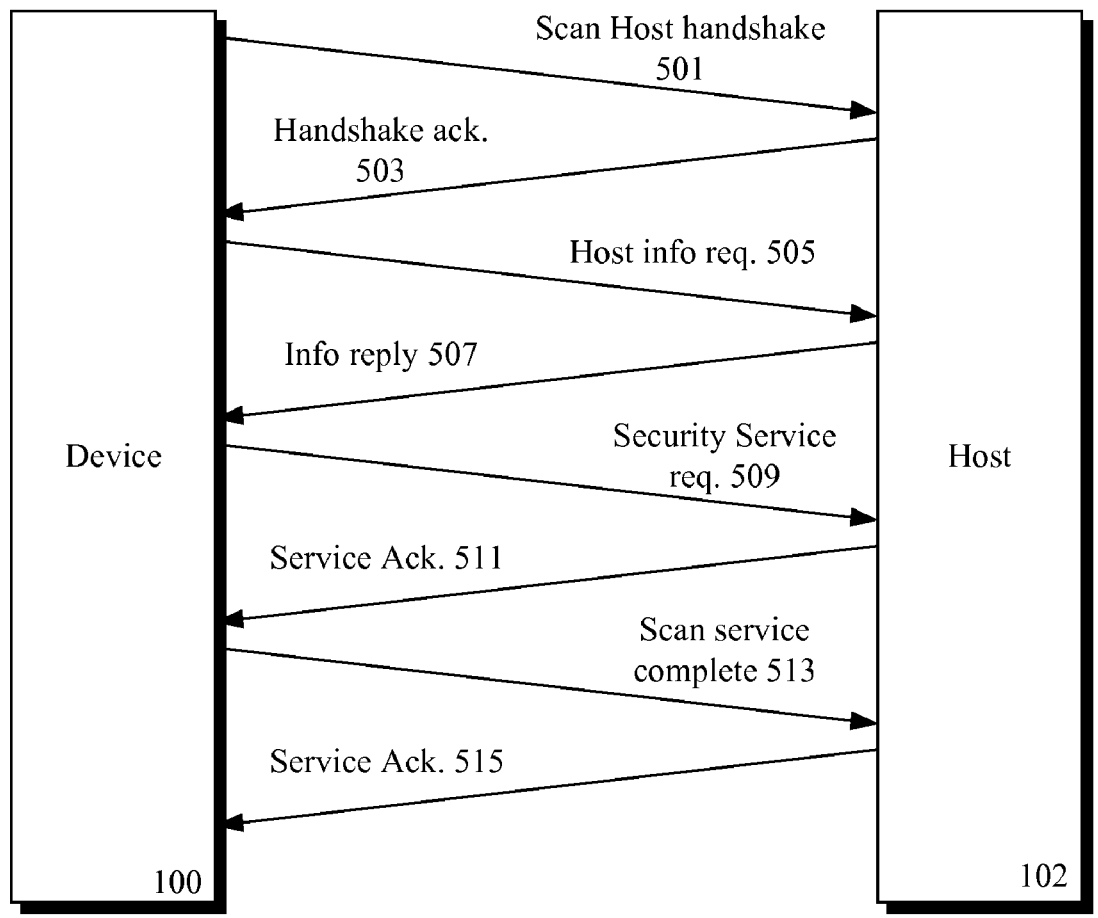
FIG. 5 is a flow diagram of the scan and search sequences as indicated at step 500 in FIG. 4.

FIG. 5 is a flow diagram of the scan and search sequences as indicated at step 500 in FIG. 4. Initially, the mobile communication device 100 sends out a scan request (e.g., "Scan Hosts Handshake") to ask a handshake communication with the host 102 (step 501). If there is an available host 102 around the mobile communication device 100, the host 102 will respond to the device 100 an acknowledgement message (e.g., "Handshake Ack") to establish a communication with the device 100 (step 503). Subsequently, the device 100 sends out a request (e.g., "Host Info Req.") of asking the host 102 to provide information of software/hardware concerning the host itself for determining whether the host 102 can support the desired application to be deployed at step 505. The requested information is then sent back to the device 100 at step 507.

The device 100 may also send out a request of security service (e.g., "Security Service req") such as a password inquiry, provided by the security service 204 to process a security check (step 509). Then, the host 102 responds to the device 100 an acknowledgement message (e.g., "Service Ack.") at step 511. Finally, the device 100 sends out a message (e.g., "Scan service complete") to indicate that the scan and search sequences are finished (step 513), while the host 102 responds to the device 100 with an acknowledgement message (e.g., "Service Ack.") at step 515. As such, the entire process of scan and search sequences are finished. It should be noted that the security service is only an optional service, and is not necessarily required in implementing the invention.

Figure 6:
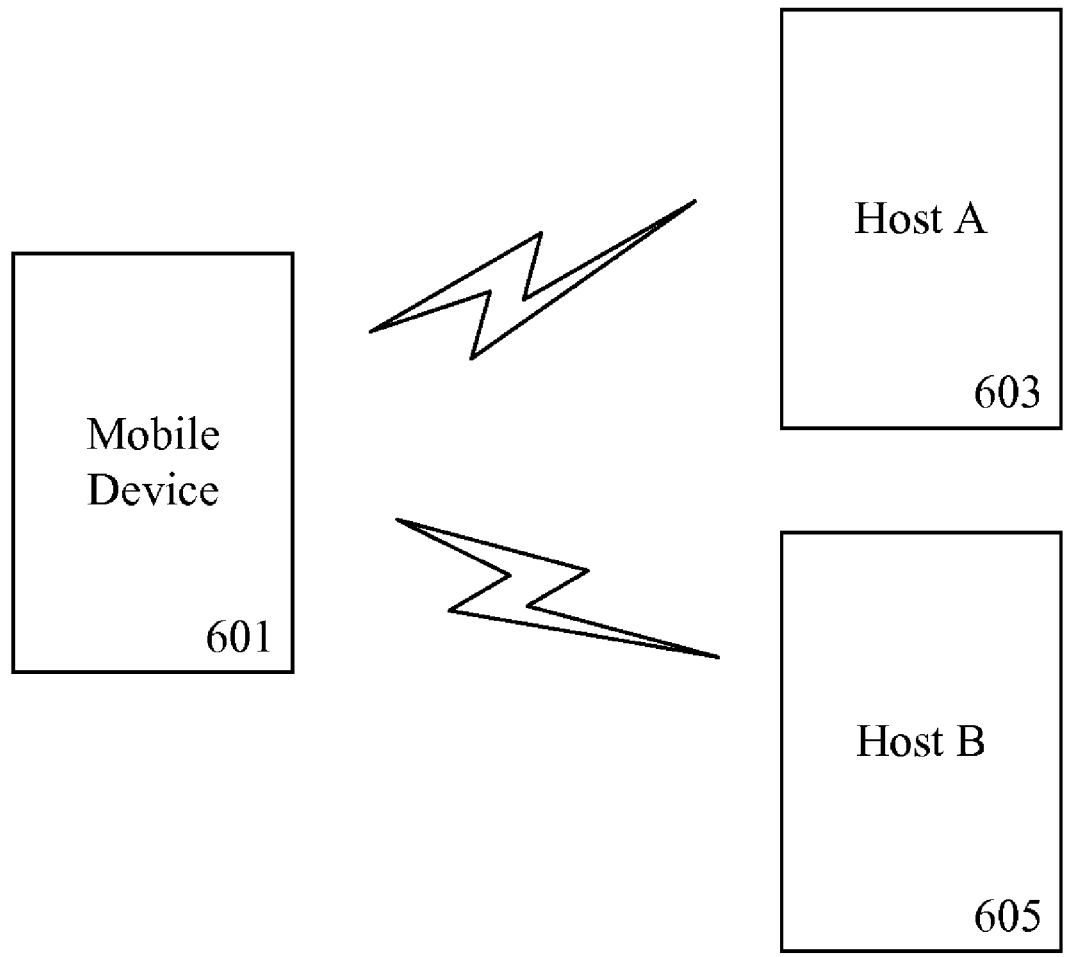
FIG. 6 depicts an example of searching an available host around a mobile communication device.

FIG. 6 depicts an example of searching an available host around a mobile communication device. The mobile communication device scans any available host around the device and may provide a user interface (UI) for a user to select one of the searched hosts. As illustrated, the mobile communication device 601 finds two hosts as candidates, respectively being host A 603 and host B 605. Next, the device 601 retrieves information of software/hardware from each host by asking each host to provide information of software/hardware concerning each host itself, and displays options of the host A 603 and the host B 605 on the screen of the device 601 for selection by a user. The user can select one of them from the screen, which means the device 601 displays an UI by the UI service 214 for the user's selection. The user may click each option to realize the detailed information of each host. Once a host is selected, the device 601 will regard the selected host as "target host" for deploying a desired application.

Figure 7:
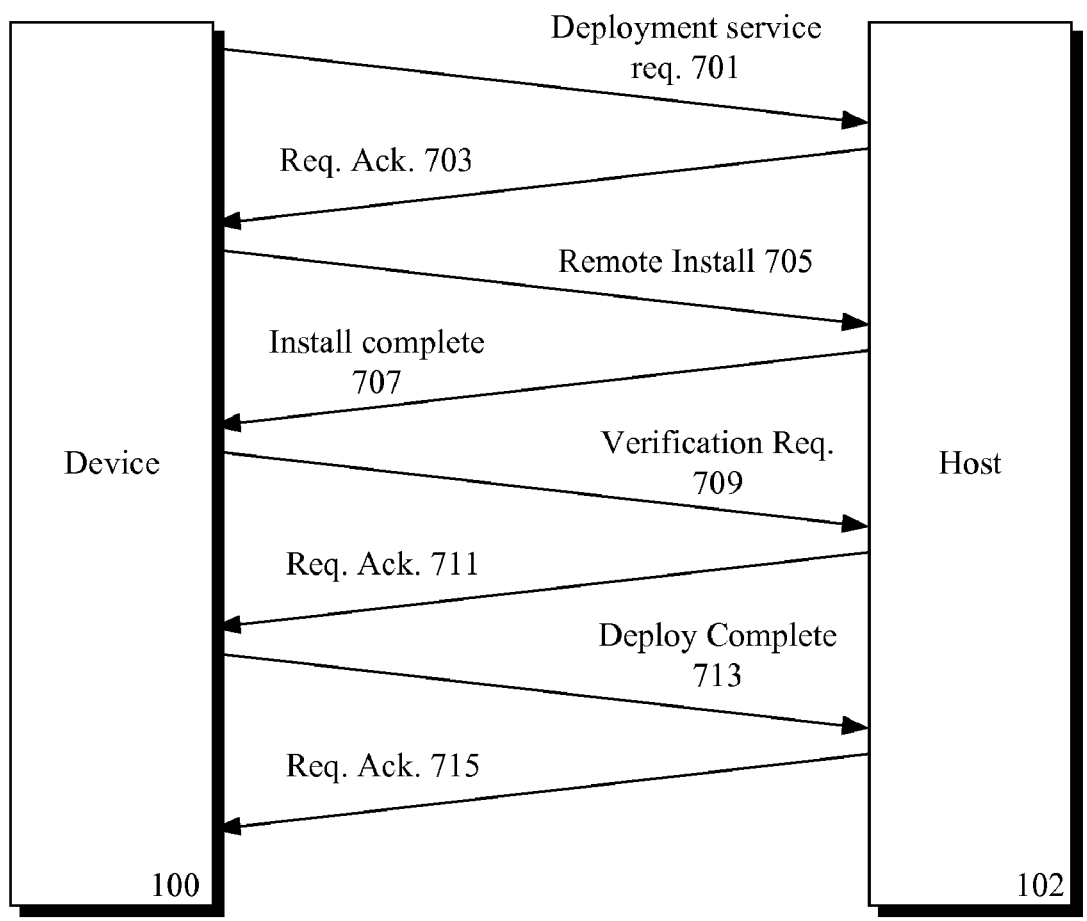
FIG. 7 is a flow diagram of the deployment sequences as indicated at step 700 in FIG. 4.

FIG. 7 is a flow diagram of the deployment sequences of a desired program from a mobile communication device to a host as indicated at step 700 in FIG. 4. After a mobile communication device finds a target host, the device can deploy a desired application to the target host. Initially, the mobile communication device 100 sends out a deployment request (e.g., "Deployment Service Req.") to the target host, i.e., selected host (step 701). The host 102 will respond to the device 100 an acknowledgement message (e.g., "Req Ack") at step 703. Next, the device 100 sends out an installation request (e.g., "Remote Install") to remotely install a desired application into the target host at step 705. After completing the installation, the host 102 will respond to the device 100 a message (e.g., "Install Complete") at step 707. Subsequently, the device 100 sends out a verification request (e.g., "Verification") to verify the application correct or available. As mentioned above, in accordance with the embodiment of the invention, the deployment of an application may be implemented by utilizing OSGi model.

According to OSGi model, applications or components (coming in the form of bundles for deployment) can be remotely installed, started, stopped, updated and uninstalled without requiring a reboot. A OSGi bundle may be in one of the following states:

INSTALLED—The bundle has been successfully installed.

RESOLVED—All Java classes that the bundle needs are available. This state indicates that the bundle is either ready to be started or has stopped.

STARTING—The bundle is being started, and the BundleActivator.start method has been called and has not yet returned.

STOPPING—The bundle is being stopped, and the BundleActivator.stop method has been called and has not yet returned.

ACTIVE—The bundle has successfully started and is running.

UNINSTALLED—The bundle has been uninstalled. It cannot move into another state.

The detailed information can further refer to URL address, http://jeffree.objectweb.org/doc/spr2book.pdf.

With reference to OSGi states, after deployed, the state is INSTALLED, while after verified, the state is RESOLVED. Thus, desired application after verified is available and ready to start. In the meantime, the host 102 will respond to the device 100 an acknowledgement message (e.g., "Req Ack") at step 711. Finally, the device 100 sends out a message (e.g., "Deploy Complete") to indicate that the deployment sequences are finished (step 713), while the host 102 responds to the device 100 an acknowledgement message (e.g., "Req Ack.") at step 715.

The verification step is in fact an optional step. As an example of the deployment sequences, the interaction between the mobile communication device 100 and the host 102 can proceed in the following way:

1) Mobile device: "Hi, I am the deployment service. Do you recognize me?"
2) Host: "Yes"
3) Mobile device: "Cool! I am going to deploy applications to you. Could you receive it?"
4) Host: "Sure"
5) Mobile device: "Is everything alright? The applications you received are correct?"
6) Host: "Yes, all are correct"
7) Mobile device: "Great! Bye"
8) Host: "Bye"

Figure 8:
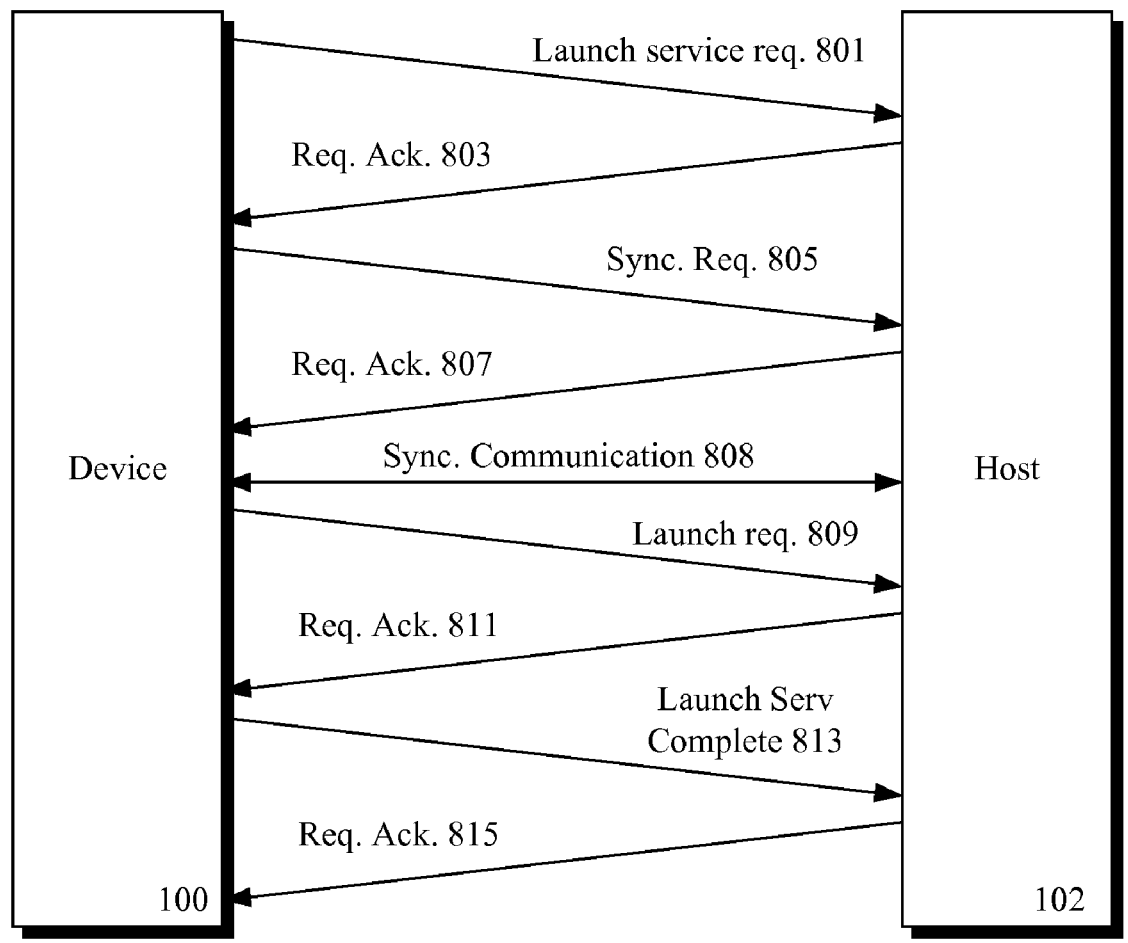
FIG. 8 is a flow diagram of the launch sequences as indicated at step 800 in FIG. 4.

FIG. 8 is a flow diagram of the launch sequences of launching a desired application deployed in a host from a mobile communication device as indicated at step 800 in FIG. 4. After a mobile communication device deploys a desired application to a target host, the device can ask the target host to launch the desired application. Initially, the mobile communication device 100 sends out a request (e.g., "Launch Service Req.") to the target host (step 801) for a launch service. The host 102 will respond to the device 100 an acknowledgement message (e.g., "Req Ack") at step 803. Subsequently, the device 100 sends out a synchronization request (e.g., "Sync. Req.") to establish the consistency of configuration/environment setup (e.g., the setup of button, speed, voice, CCD or microphone, etc.) between any input device and/or the motion detector embedded on the mobile communication device and the desired application deployed in the host. In accordance with an embodiment of the invention, a user interface (UI) can be provided on the mobile communication device or the host for the mobile user's selection of an application to be launched and related configuration/environment setup. The host 102 will respond to the device 100 an acknowledgement message (e.g., "Req Ack") at step 807. At step 808, synchronization communication between the mobile communication device and the host is in progress to synchronize the configuration and environment setup there between.

FIG. 8 is a flow diagram of the launch sequences of launching a desired application deployed in a host from a mobile communication device as indicated at step 800 in FIG. 4. After a mobile communication device deploys a desired application to a target host, the device can ask the target host to launch the desired application. Initially, the mobile communication device 100 sends out a request (e.g., "Launch Service Req.") to the target host (step 801) for a launch service. The host 102 will respond to the device 100 with an acknowledgement message (e.g., "Req Ack") at step 803. Subsequently, the device 100 sends out a synchronization request (e.g., "Sync. Req.") to establish the consistency of configuration/environment setup (e.g., the setup of button, speed, voice, CCD or microphone, etc.) between any input device and/or the motion detector embedded on the mobile communication device and the desired application deployed in the host. In accordance with an embodiment of the invention, a user interface (UI) can be provided on the mobile communication device or the host for the mobile user's selection of an application to be launched and related configuration/environment setup. The host 102 will respond to the device 100 with an acknowledgement message (e.g., "Req Ack") at step 807. At step 808, synchronization communication between the mobile communication device and the host is in progress to synchronize the configuration and environment setup there between.

Referring still to FIG. 8, the device 100 then sends out a launch request (e.g., "Launch Req.") to the target host for launching a desired application deployed in the host (step 811). After launching the application, the host 102 will respond to the device 100 with a message (e.g., "Req. Ack") at step 811. Finally, the device 100 sends out a message (e.g., "Launch Serv. Complete"), to indicate that the launch sequences are finished (step 813), while the host 102 responds to the device 100 with an acknowledgement message (e.g., "Req Ack.") at step 815. Now, the desired application is in a running state and running in the preferred host, and then the user can utilize the device 100 to communicate and interact with the preferred host to control the application As an example of the launch sequences, the interaction between the mobile communication device 100 and the host 102 can proceed in the following way:
1) Mobile device: "Hi, this is the launch service. Do you recognize me?"
2) Host: "Yes"
3) Mobile device: "I would like to launch the application C. Before that, I want to synchronize the configuration and environment setup."
4) Host: "Sure, let's do it."
5) Mobile device and Host communications for synchronization and environment setup.
6) Mobile device: "OK, let's launch the application C."
7) Host: "OK, I have launched it. It's running."

In the meantime, a user can use the mobile communication device interacted with the host to control the application, similar to control a WII game via WII Remote.

As mentioned above, by utilizing the technology disclosed in the embodiment of the invention, a user can bring only a mobile communication device embedded with a motion detector and stored a desired game/application (e.g., similar to a WII game) to any place having an available host, and automatically run/play the application similar to a WII game without the need to carry a WII console and a set of WII Remotes. For example, a user A brings a mobile communication device stored an interactive game/application similar to a WII game in accordance with the embodiment of the invention, while another user B has an available host and another mobile communication device in accordance with the embodiment of the invention. When the user A visits the user B, the user A could automatically deploy the interactive game/application into an available host around the user B, and then play the game/application with the user B at the user B's place. The user B does not need to prepare a WII console or an extra WII Remote controller as usual in WII environment.

The invention is not limited to a mobile communication device embedded with a motion detector which can be used to automatically deploy an interactive game/application (e.g., similar to a WII game) stored in the mobile communication device to an available host, and then run the game/application to interact with the host to play the game/application. The mobile communication device according to the present invention may carry any general application not limited only to a game/application similar to a WII game. Hence, a user can use the mobile communication device as a remote controller of the application deployed into a host to interact with the host for controlling the application and providing input thereto. For example, the mobile communication device can further be embedded with a microphone, and carry a Karaoke game. Then, the mobile communication device can be used as a wireless microphone to interact with the Karaoke game for playing.

The illustration of the embodiment of the present invention is given above for a better understanding of the characteristics and spirit of the present invention. It will be understood that the invention is not limited to the particular embodiment described herein, but is capable of various modifications and rearrangements without departing from the scope of the invention. Therefore, it is intended that the following claims, accompanied by detailed descriptions giving the broadest explanation, not only define the scope of the present invention but also cover all such modifications and changes as fall within the true spirit and scope of the present invention.

What is claimed is:

1. A method for auto-deploying an application from a mobile communication device to a host, comprising:
    downloading said selected game application to said mobile communication device over a wireless network via a mobile telephony communication protocol;
    detecting and selecting an available host around the mobile communication device;
    determining if the mobile communication device issues a request of auto-deploying a selected game application into said available host;
    in response to the issued auto-deploying request, auto-deploying said selected game application into said available host for execution, wherein the auto-deploying conveys the core functions of the selected game application from a memory of the mobile communication device to the host over the wireless communication network via a mobile telephony communication protocol, wherein the auto-deploying causes core functions that are a portion of the selected game application for launching the selected game application to be conveyed to the host, wherein additional functions of the selected game applications are accessed by the host from the mobile communication device when necessary thereby alleviating a need to deploy a full size of the selected game application into the host from the mobile device; and
    using the mobile communication device as a wireless controller for the selected game application as the selected game application executes on the host.

2. The method according to claim 1, wherein the auto-deploying of the selected game application is implemented by utilizing an OSGi model, wherein digital rights management information for the selected game application is maintained by an application management service of the mobile communication device.

3. The method according to claim 1, wherein said step of downloading the selected game application to the mobile communication device is performed by directly copying said selected game application from said server storing said selected game application to the mobile communication device.

4. The method according to claim 1, wherein said step of downloading the selected game application to said mobile communication device is performed by downloading said selected game application from said server storing said selected game application to said mobile communication device being a wireless connection type.

5. The method according to claim 1, further comprising a step of sending out a request from said mobile communication device to launch said selected game application deployed in said host to direct said host to auto-run said selected game application.

6. The method according to claim 5, further comprising a step of synchronizing communication to establish the consistency of configuration and environment setup between any input device on the mobile communication device and said selected game application deployed in said host in order to interact with said host for controlling said selected game application in a running state.

7. The method according to claim 6, wherein said mobile communication device comprises a built-in motion detector to interact with said host for controlling said selected game application in a running state.

8. The method according to claim 7, wherein said selected game application is the game software utilizing motion sensing capabilities of the mobile communication device.

9. A mobile communication device for auto-deploying an application to a host, comprising:
 means for downloading a selected game application from a server to a memory of a mobile communication device over a wireless network via a mobile telephony communication protocol;
 means for detecting and selecting an available host around the mobile communication device;
 means for determining if the mobile communication device issues a request of auto-deploying the selected game application into the available host; and
 in response to the issued auto-deploying request, means for auto-deploying said selected game application into said available host for execution, wherein said auto deploying conveys at least a portion of the functions of the selected game application from the memory of the mobile communication device to the host over the wireless communication network via a mobile telephony communication protocol, wherein additional functions of the selected game application are accessed by the host from the mobile communication device when necessary thereby alleviating a need to deploy a full size of the selected game application into the host from the mobile device;
 means for sending out a request from said mobile communication device to launch said selected game application deployed in said host to direct said host to auto-run said selected game application; and
 means for using the mobile communication device as a wireless controller for the selected game application when it executes on the host.

10. The mobile communication device according to claim 9, further comprising means for downloading said selected game application from said server storing said selected game application to said mobile communication device in wireless connection type.

11. The mobile communication device according to claim 9, wherein said means for auto-deploying is implemented by utilizing an OSGi model.

12. The mobile communication device according to claim 9, further comprising means for using the mobile communication device as a wireless microphone for the selected game application executing on the host.

13. The mobile communication device according to claim 12, further comprising means for synchronizing communication to establish the consistency of configuration and environment setup between any input device on the mobile communication device and said selected game application deployed in said host in order to interact with said host for controlling said selected game application in a running state.

14. The mobile communication device according to claim 13, wherein said mobile communication device comprises a built-in motion detector to interact with said host for controlling said selected game application in a running state.

15. The mobile communication device according to claim 14, wherein said selected game application is the game software utilizing motion sensing capabilities of the mobile communication device.

16. A method for auto-deploying an application from a mobile communication device to a host, comprising:
 downloading a selected game application to a memory of a mobile communication device over a wireless network via a mobile telephony communication protocol;
 detecting and selecting an available host from a plurality of different hosts around the mobile communication device;
 determining if the mobile communication device issues a request of auto-deploying the selected game application into said available host; and
 in response to the issued auto-deploying request, auto-deploying a portion of said selected game application from the memory of the mobile communication device into said available host for execution, wherein additional functions of the selected game application are accessed by the host from the mobile communication device as necessary thereby alleviating a need to deploy a full size of the selected game application into the host from the mobile communication device, wherein the auto-deploying of the selected game application is implemented by utilizing an OSGi model, wherein said mobile communication device comprises a built-in motion detector and a built in microphone to interact with said host for controlling said selected game application in a running state.

17. The method of claim 16, wherein the auto-deploying causes core functions of the selected game application for launching the selected game application to be conveyed to the host, wherein digital rights management information for the selected game application is maintained by an application management service of the mobile communication device.

18. The method of claim 16, wherein said auto deploying conveys the portion of said selected game application from the memory of the mobile communication device to the host over the wireless communication network via a mobile telephony communication protocol, said method further comprising:

sending out a request from said mobile communication device to launch said selected game application deployed in said host to direct said host to auto-run said selected game application.

* * * * *